United States Patent
Dunford et al.

[11] 3,819,205
[45] June 25, 1974

[54] MODULAR OCCUPANT RESTRAINT SYSTEM

[75] Inventors: Sidney G. Dunford; James R. Weaver, both of Dayton, Ohio

[73] Assignee: General Motors Corporation, Detroit, Mich.

[22] Filed: Sept. 25, 1972

[21] Appl. No.: 291,698

[52] U.S. Cl. .................................... 280/150 AB
[51] Int. Cl. ............................................ B60r 21/08
[58] Field of Search ............................. 280/150 AB

[56] References Cited
UNITED STATES PATENTS

| | | |
|---|---|---|
| 3,525,536 | 8/1970 | Pruneski ................. 280/150 AB |
| 3,600,003 | 8/1971 | Carey ..................... 280/150 AB |
| 3,632,135 | 1/1972 | Chute ..................... 280/150 AB |
| 3,674,284 | 7/1972 | Lohr ....................... 280/150 AB |
| 3,680,884 | 8/1972 | Stephenson ............ 280/150 AB |

*Primary Examiner*—David Schonberg
*Assistant Examiner*—Terrance L. Siemens
*Attorney, Agent, or Firm*—Herbert Furman

[57] ABSTRACT

A vehicle steering wheel includes a generally rectangularly shaped dished hub connected to a rim by four offset spokes extending generally from the corners of the hub. A generally rectangularly shaped support plate generally coextensive with the hub opening includes a central aperture and four offset extensions which overlie the spokes of the wheel. Offset lateral tabs from the support plate extensions seat on apertured embossments of the hub and are bolted thereto from the lower side of the hub. A gas generator fits between the support plate and hub and is bolted to the lower side of the plate. The outlet of the generator projects through the support plate opening. A diffuser overlies the generator outlet and is bolted through the open end of an inflatable cushion to the support plate with the gas generator. A rectangularly shaped container covers the support plate, the cushion and the diffuser. The container includes an H-shaped weakened line and extensions which overlie the support plate extensions. An outer decorative flexible closure covers the container and extensions and includes an H-shaped weakened line generally corresponding to that of the container. The closure is commonly secured with the container to the lower side of the support plate and seats on the hub opening. A conductor includes arms which overlie the container extensions and underlie discrete flexible finger depressible portions of the closure. Foam pads space the arms from ground clips which are secured to the container extensions and seat on the support plate. Upon depression of the pads the arms of the conductor complete the circuit to blow the horn. When the gas generator is actuated by a suitable sensor, the pressure fluid generated flows through the diffuser to inflate the cushion. The cushion is deployed through the container and closure as the weakened lines thereof are ruptured to provide flaps. Likewise the conductor is preweakened to rupture and not interfere with cushion deployment.

14 Claims, 7 Drawing Figures

PATENTED JUN 25 1974          3,819,205

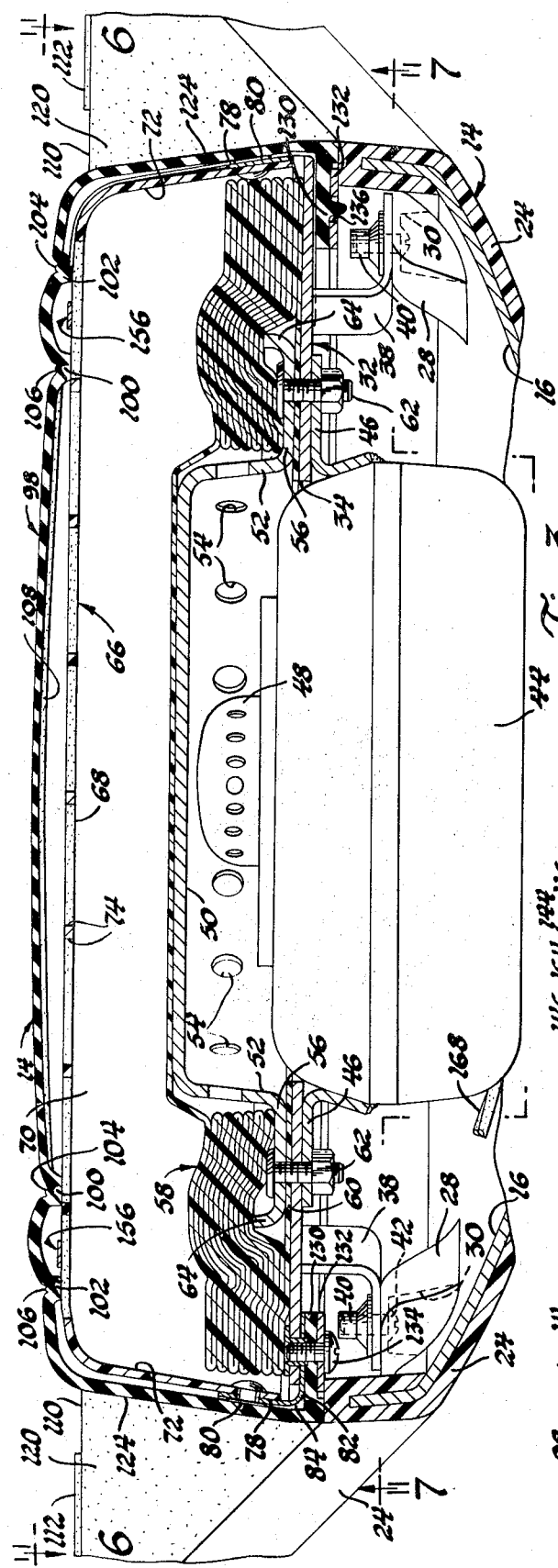

MODULAR OCCUPANT RESTRAINT SYSTEM

This invention relates generally to occupant restraint systems for the driver of an automotive vehicle and more particularly to such a system which is modular so as to be easily installed and removed from the steering wheel as a unit.

Occupant restraint systems for the driver of an automotive vehicle are well known. Generally such systems include a pressure fluid source of any conventional type, such as stored gas, hybrid, or gas generating. The source may be mounted on the steering wheel or the steering column, or may be mounted remote from either and connected to the inflatable cushion. The sensor which actuates the pressure fluid source is normally mounted remote from the wheel and column in order to sense impacts received by the vehicle or the probability or possibility of such impacts.

The system of this invention differs from such systems in that it is of modular construction and is easily installed and removed as a unit. The system includes all components required to provide an inflatable occupant restraint cushion, including the pressure fluid source, and also the horn blowing switch.

The module fits within the steering wheel and is mounted to the hub of the wheel by a plurality of fastening members which are easily accessible from the lower side of the wheel. The electrical connection to the control and monitoring system for the gas generator and the electrical connection for the horn switch can be conventionally made through the use of jacks.

By making the system of modular construction, the system can be assembled and tested prior to installation on the vehicle. Likewise if removal is required for any reason, the fasteners need only be removed, the electrical connections disconnected and the entire system can be removed and a replacement installed in a minimum period of time.

In a preferred embodiment of the invention, a support plate generally conforming to the shape of the opening of a dished hub includes extensions which overlie the spokes. Offset flanges on the support member seat on embossments of the hub and are secured thereto by fasteners inserted from the lower side of the hub. The support plate mounts the gas generator, the diffuser, the cushion, a container for the cushion, and an outer decorative closure which covers the foregoing components. The container and support plate cooperatively mount the horn blowing switches which are of the pressure actuated type. Both the container and the closure are provided with weakened portions which rupture to provide an opening so that the cushion can deploy therethrough when the gas generator is actuated. The component parts are easily assembled to the support plate and the entire system can be tested prior to installation on the vehicle.

One feature of this invention is that it provides a modular occupant restraint system wherein all of the components of the system, except for the sensor, are unitized to provide a module easily assembled to and disassembled from a steering wheel of an automotive vehicle. Another feature of this invention is that the module includes a gas generator, a diffuser, a cushion, a container housing the cushion, and an outer decorative closure which are all mounted to a support plate. A further feature of this invention is that the module additionally includes horn blowing switch means of the pressure actuated type. Yet another feature of this invention is that the support plate and the steering wheel hub cooperatively locate the support plate in spaced relationship to the hub to provide space therebetween for the gas generator, with the plate being easily assembled to and disassembled from the hub by means of conventional fasteners accessible from the lower side of the hub. Yet a further feature of this invention is that the cushion is assembled to the support plate to the upper side thereof through the diffuser for the gas generator, with the container enclosing the cushion and diffuser and having preweakened lines to permit rupture thereof by the cushion when the cushion is inflated. Still another feature of this invention is that the outer decorative closure covers the container and support plate and is secured to the plate, with the closure having preweakened lines generally coextensive with those of the container to permit deployment of the cushion therethrough when inflated. Still a further feature of this invention is that the container includes arms which seat on extensions of the support plate overlying the spokes of the wheel, with the arms and extensions cooperatively mounting the contacts of horn blowing switch means for the vehicle, the switch means being enclosed by the closure and being actuated by depression of discrete pressure actuated portions of the closure which are manually deflectable by the driver.

These and other features of this invention will be readily apparent from the following specification and drawings wherein:

FIG. 3 is an enlarged sectional view taken generally along the plane indicated by line 3—3 of FIG. 2;

FIG. 4 is an enlarged sectional view taken generally along the plane indicated by line 4—4 of FIG. 2;

FIG. 5 is an enlarged perspective view of one of the contacts of the horn blowing switch means;

Figure 1:
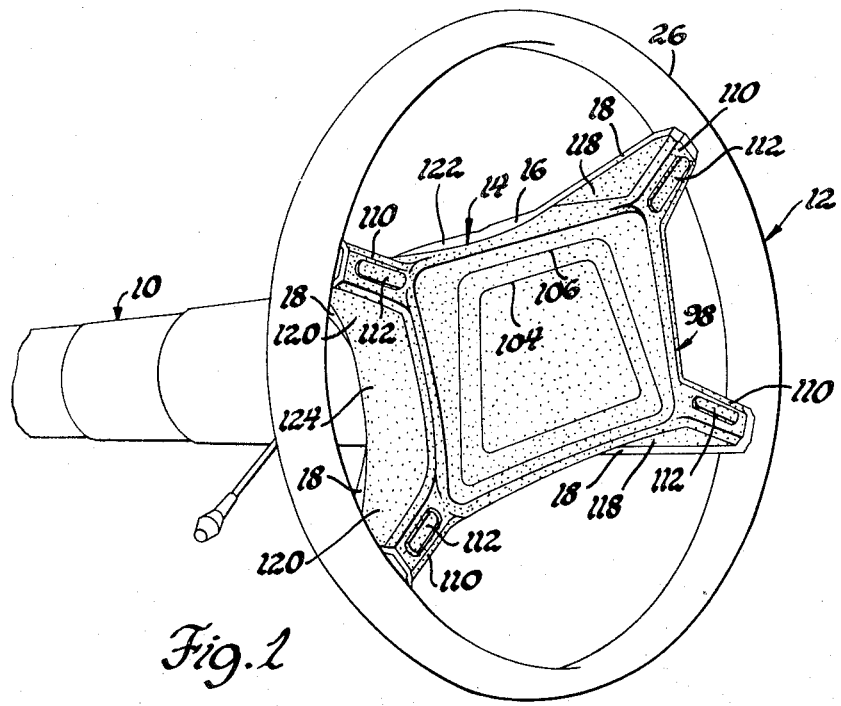
FIG. 1 is a perspective view of a portion of an automotive vehicle including a steering column and steering wheel mounting a modular occupant restraint system according to this invention.

Referring now particularly to FIG. 1 of the drawings, an automotive vehicle includes a steering column assembly designated generally 10 which is preferably of energy absorbing construction. A steering wheel 12 is conventionally mounted on the rearward end of the steering shaft of column 10 by a splined member fixed to the hub of the wheel and receiving and being bolted to the splined upper end of the steering shaft, these details not being shown. A modular occupant restraint system designated generally 14 is mounted to the steering wheel 12. The system 14, as will be apparent from a further description, includes a pressure fluid source, preferably a gas generator. The gas generator is electrically actuated from a conventional power source, such as the vehicle battery or a capacitor charged by the battery, and is actuated when acceleration responsive, velocity responsive, or any other conventional type of sensor is actuated by impact of the vehicle with an obstacle or the possibility or probability of such an impact. Such sensors as well as the monitoring and the control circuits for the sensors and the gas generator are well known and are therefore not shown.

Figure 6:
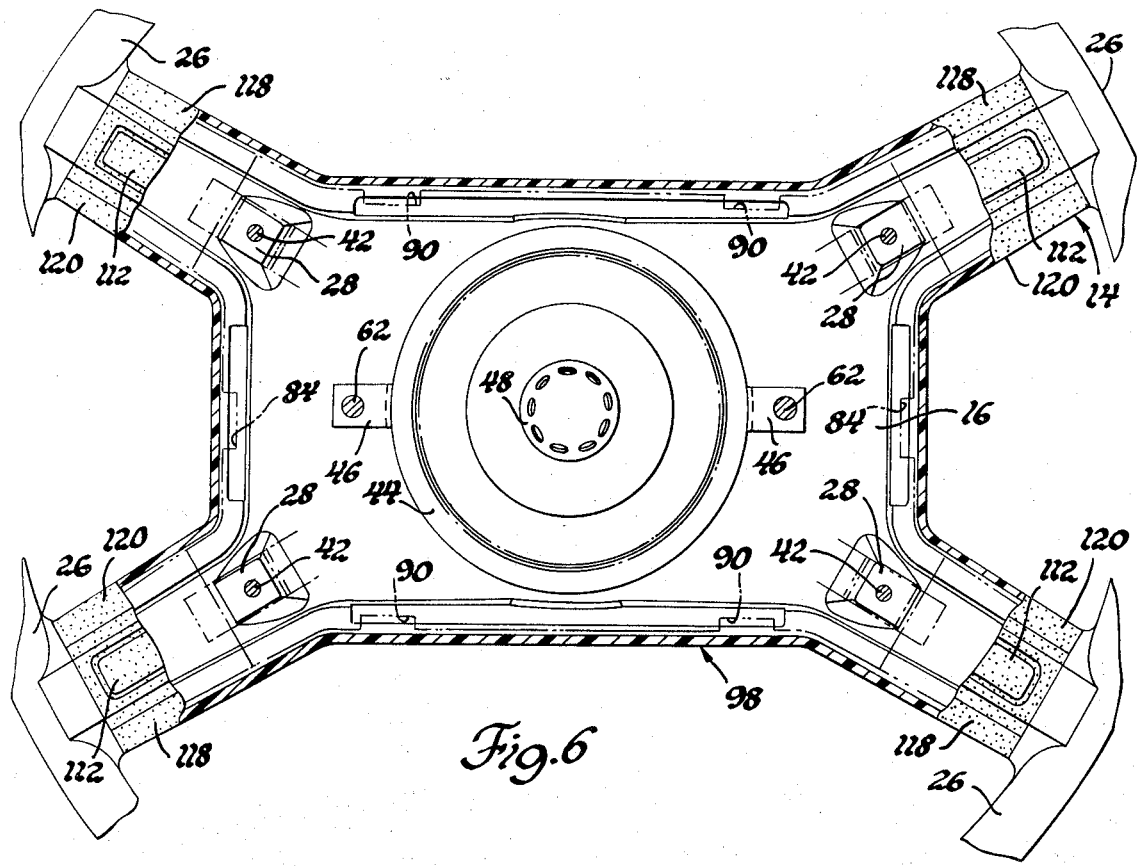
FIG. 6 is a view taken generally along the plane indicated by line 6—6 of FIG. 3.

Referring now to FIGS. 3, 4 and 6 of the drawings, the steering wheel 12 includes a stamped metal hub 16 of generally rectangular shape and being dished as can be seen in FIG. 3. The hub 16 has integrally formed therewith four spokes 18, FIG. 4, which are of shallow U cross section and are offset upwardly from the corners of the hub. The upper terminal ends 20 of the spokes are welded to a cruciform shaped circular member 22. The lower surface of the hub, the upper edge of the hub, the lower surfaces and edges of the spokes 18, and the member 22 are integrally covered by molded plastic 24. The member 22 forms the core of the rim 26 of the steering wheel.

As best shown in FIGS. 3, 4 and 6, the hub 16 includes four upwardly offset apertured seats 28 and the plastic covering 24 is cored at 30 to provide access to these offsets from the lower side of the steering wheel.

Figure 7:
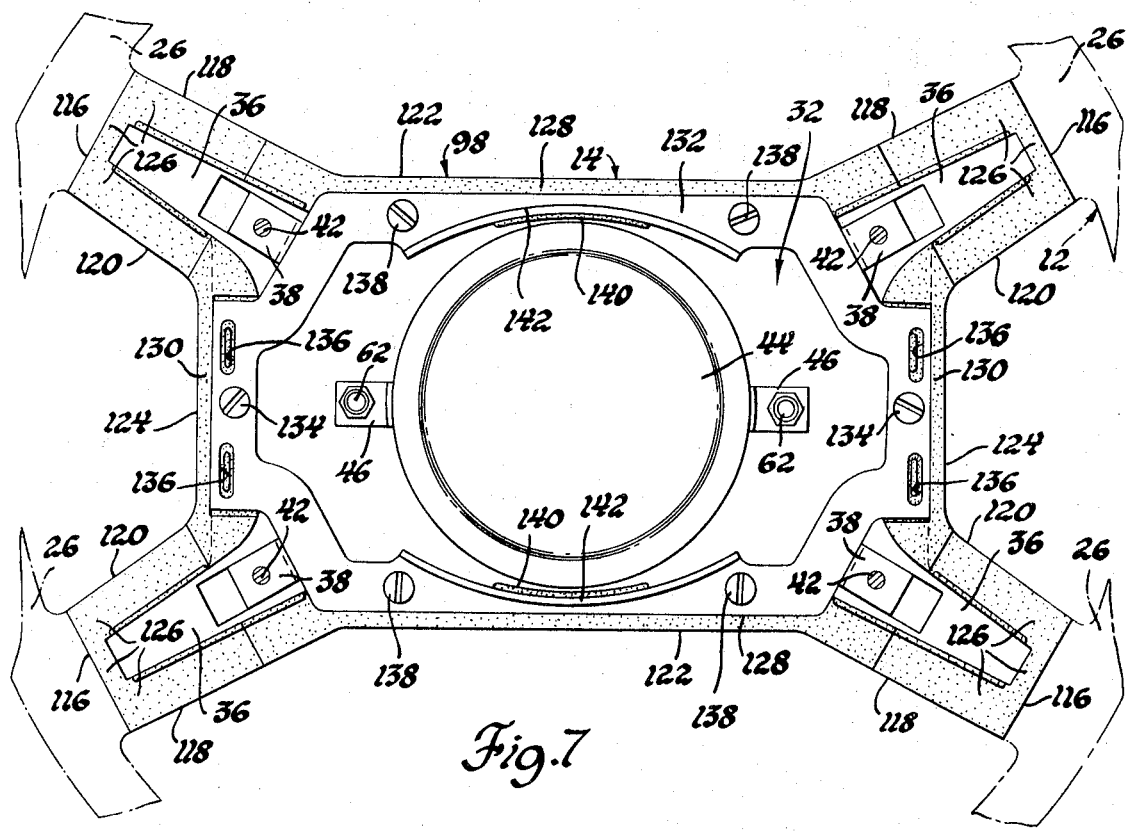
FIG. 7 is a view taken generally along the plane indicated by line 7—7 of FIG. 3.

With reference now to FIG. 7, a generally rectangularly shaped support member or plate 32 is generally coextensive with the opening of hub 16 and includes a central circular aperture 24 and four angularly extending arms or extensions 36, best shown in FIG. 4. Lateral offset tabs 38 are lanced from the plate 32 and seat on the embossments 28 to thereby space the plate 32 with respect to the hub 16 and likewise locate the arms 36 in overlying relationship to the spokes 18. Conventional tapped nuts 40 which are mounted to the tabs 38 receive bolts 42 to thereby provide for assembly of the support plate 32 to the hub of the steering wheel and likewise permit easy removal of the support plate from the hub. As will be apparent from a further description, the plate 32 mounts all of the other components of the occupant restraint system so that the entire system is assembled to the steering wheel by the bolts 42 and is likewise disassembled from the steering wheel when the same bolts are removed.

As shown in FIG. 3, a conventional gas generator 44 is received within the central aperture 34 of the plate 32. The gas generator includes peripheral apertured flanges 46 which seat against the lower side of the plate 32. The outlet 48 of the gas generator extends to the upper side of the plate 32. A circular diffuser 50 includes a lateral peripheral wall 52 provided with a series of circular openings 54. The wall 52 terminates in a lateral flange 56 which overlies the upper side of the plate 32.

An inflatable occupant restraint cushion 58 is fitted around the diffuser 50 in a folded condition so as to receive pressure fluid into the interior thereof through the diffuser openings 54 when the gas generator 44 is actuated. As best shown in FIG. 3, the open end 60 of the cushion fits underneath the flange 56 of wall 52 and a series of bolts 62 project through aligned openings in the flange, the end 60, the plate 32, and the flanges 46 to thereby mount the diffuser, the cushion and the gas generator to the plate 32. It will be noted with reference to FIG. 3 that the terminal end 64 of flange 56 is arcuately offset upwardly. This ensures that the end portion 60 of the cushion wraps around the diffuser and is not cut when the cushion is inflated. The cushion 58 is conventionally formed of either a suitable nonporous material, such as neoprene coated dacron, and provided with one or more pressure relief valving arrangements, or may be formed of porous material. No further details of the cushion are believed necessary since it is conventional.

Figure 2:
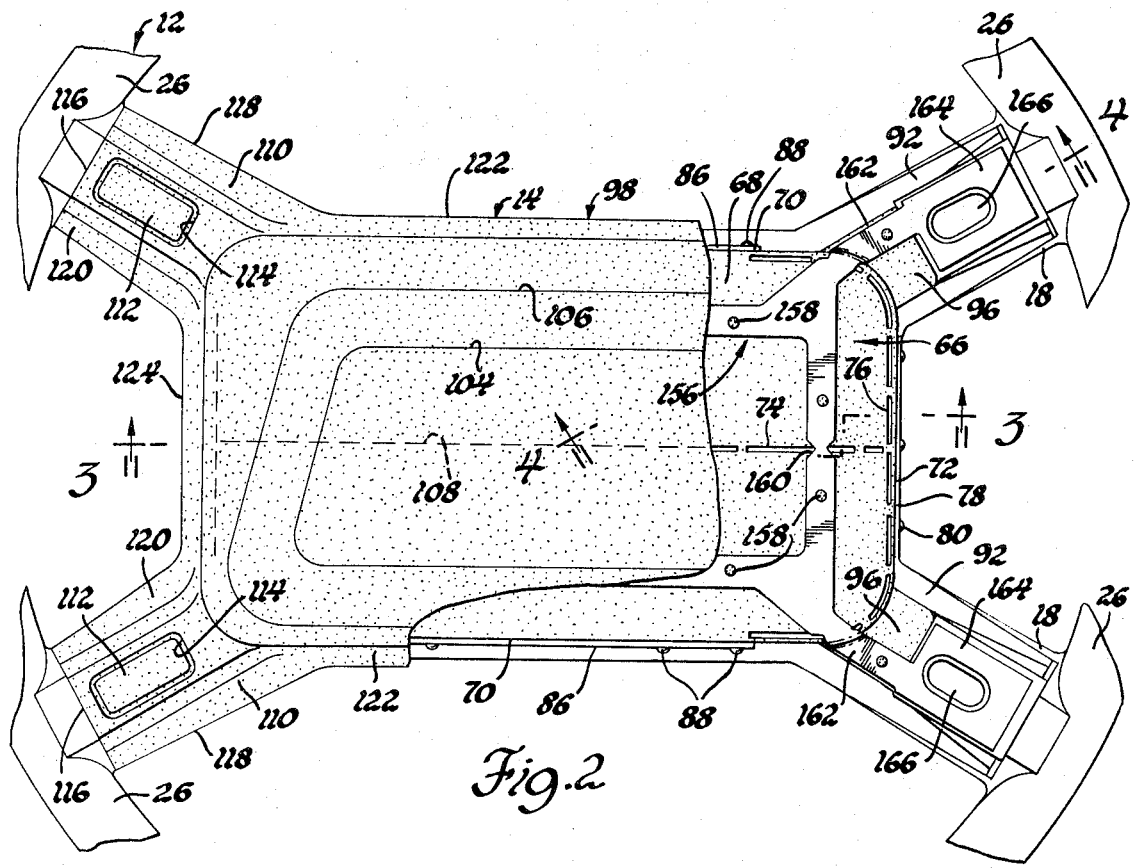
FIG. 2 is an enlarged partially broken away view of a portion of FIG. 1.

A generally rectangularly shaped container 66 of plastic material includes a base wall 68 and a lateral side wall which includes longitudinal wall sections 70 and lateral wall sections 72. As best shown in FIG. 2, the wall 68 is bisected by a longitudinal rupture line 74 which is integrally provided by means of thin slots or grooves slightly spaced from each other. A lateral rupture line 76 crosses each end of line 74 adjacent each wall section 72 and extends partially along the wall sections 70. These rupture lines divide the base wall 68 into two flaps, each integrally hinged to a respective wall section 70 to permit deployment of the cushion 58 from the container 66 as will be further described. An elongated metal bracket 78 is riveted at 80 to each wall section 72 adjacent the free edge thereof. An apertured tab 82 of each bracket, FIG. 3, extends through a slot 84 in a respective lateral side of the support plate 32 to the lower side thereof. Likewise, an elongated metal bracket 86, FIG. 2, is riveted at 88, to each wall section 70 adjacent the free edge thereof. The spaced lateral tabs, not shown, of each bracket extend through slots 90, FIG. 6 in the longitudinal sides of the support plate 32 to the lower side thereof. The tabs provide for mounting of the container to the support plate as will be further described.

The container 66 further includes an integral slightly angled extension 92 at each corner thereof which is reinforced to the adjacent wall sections 70 and 72 by a V-shaped integral rib 94, FIG. 4. Each extension is offset from base wall 68 by an offset integral wall 96.

With reference now to FIGS. 1, 2 and 3, an outer generally rectangularly shaped decorative closure 98 covers the container 66. The closure 98 is formed of flexible plastic material and the base or upper wall thereof includes ribs 100 and 102 on the lower side thereof which seat on the wall 68 of the container 66 to space the closure 98 therefrom as shown in FIG. 3. The ribs 100 and 102 define decorative grooves 104 and 106, respectively, on the upper side of the closure as shown in FIGS. 1 and 2. The closure further includes an H-shaped groove 108, FIG. 2, in the lower surface of the upper wall thereof. Groove 108 provides a weakened line generally coextensive with the H-shaped weakened line 74 and 76 of container 66. The upper wall of the closure thus separates into flaps in the same manner as the wall 68 of the container to permit deployment of the cushion when it is inflated.

An extension portion 110 extends from each corner of the closure and overlies a respective extension 92. Each such extension portion is provided with an elongated discrete finger deflectable portion 112, FIGS. 1 and 4, which is defined by a continuous groove 114. Each extension portion 110 includes an end wall 116 which abuts a flat of the rim 26, FIG. 4, and side walls 118 and 120, FIGS. 1 and 2, which enclose respective extensions 36 and 92 and merge in longitudinal and lateral side walls 122 and 124 respectively of the closure, FIGS. 1 and 2. Walls 116, 118 and 120 terminate in a continuous flange 126, FIG. 7, which underlies a respective extension 36. The flanges 126 merge into flanges 128 and 130 of walls 122 and 124, respectively, which underlie the longitudinal and lateral side edge portions of plate 32.

A generally rectangularly shaped bracket 132, FIG. 7, overlies flanges 128 and 130. Bolts 134 extend through openings in the bracket, flange 130 and tabs 82, FIG. 3, and into weld nuts secured to plate 32 to secure the bracket 132, closure 98 and container 66 to the plate 32. Slots 136 of the bracket receive integral ribs of flanges 130 to further secure the flanges in place. Bolts 138 likewise extend through openings in the bracket 132, flanges 128, and the tabs of bracket 86 and into like weld nuts secured to plate 32 to additionally secure the bracket 132, closure 98, and container 66 to plate 32. Arcuate ribs 140 on the flanges 128 engage behind arcuate ribs 142 of bracket 132 to further secure flanges 128 in place. As best shown in FIG. 3, the flanges 130 seat on the upper plastic covered edge of the hub 16 of the steering wheel and the flanges 128 likewise seat on the same edge of the hub. The walls 122 and 124 form a continuation of the outer side wall of the hub 16. The engagement of the flanges 128 and 130 with the plastic covered upper edge of hub 16 provides a seal.

As shown in FIG. 4, a member 144 of foam plastic overlies each extension 92 and includes a central slot or elongated aperture 146. Located intermediate each member 144 and the extension is the body 148 of a metal ground clip 150, shown in detail in FIG. 5. The body 148 has extending therefrom integral return bent legs 152 which clamp to the underside of each extension 92 and an intermediate integral return bent leg 154 which seats on and electrically contacts each extension 36 of the plate 32, which is formed of metal and is grounded to the vehicle through the steering shaft.

As best shown in FIG. 2, a generally rectangularly shaped conductor 156 seats on the base wall 68 of the container 66 between ribs 100 and 102. The conductor is comprised of upper and lower thin layers of polyester material which are adhesively laminated to an intermediate thin layer of copper. The conductor includes a number of openings which receive embossments 158 of wall 68. The embossments are heat flanged over the conductor to secure the conductor in place. The lateral legs of the conductor are notched at 160 over the weakened line 74 of wall 68 so that these legs can rupture when the cushion 58 is inflated. An arm 162 extends from each corner of the conductor and is notched over the weakened line 76. Each arm is secured to a respective offset 96 in the same manner as the conductor is secured to wall 68, see FIG. 4. Each arm terminates in a contact 164 of generally rectangular shape which seats on the member 144 and includes a depressed portion 166 received within the slot 146. The contact 164 is of the same construction as the conductor except that the lower layer of polyester material is removed so that the intermediate layer of copper is exposed.

The depressed portion 166, when closed to the body 148 of clip 150 connects the horn blowing circuit to ground so as to blow the horn. Should the driver wish to blow the horn, he manually depresses the portion 112 of the closure which in turn compresses member 144 and engages the lower surface of the depressed portion 166 with the body of the clip. It will be recalled that the clip is grounded as previously mentioned.

Although not shown in the drawings, the conductor 156 is connected to a suitable jack and likewise the leads 168 of the gas generator 44 are connected to a suitable jack. The one jack connects to the horn blowing circuit of the vehicle and the other connects to the control and monitoring circuit of the occupant restraint system.

From the foregoing description, it can be seen that all of the components necessary to inflate the cushion 58 are mounted to the support plate 32 which in turn is easily installed and removed by means of the bolts 42. Likewise the horn blowing switch means are included in the module.

Briefly, when the gas generator 44 is actuated, the resultant gases flow from the outlet 48 through the openings 54 of the diffuser and into the interior of the cushion 58 to inflate the cushion. As the cushion inflates, the container 66 will rupture along the weakened lines 74 and 76 to provide clamshell type oppositely opening flaps, and the closure 98 will likewise rupture along the line 108 to provide like flaps and permit deployment of the inflated cushion outwardly of the rim 26 of the wheel for engagement with the driver. The conductor 156 and the arms 162 rupture at their notched areas so as not to interfere with deployment of the cushion.

Thus, this invention provides an improved modular occupant restraint system.

What is claimed is:

1. In combination with a vehicle steering wheel including an upwardly opening hub adapted to be releasably secured to a vehicle steering column assembly and a rim, a modular occupant restraint system comprising, in combination, a support member, cooperating means on the support member and steering wheel locating the support member in overlying relationship to the hub opening, an inflator located below the support member generally within the hub, means mounting the inflator to the support member, a container mounted on the support member and providing a housing for an occupant restraint cushion, an occupant restraint cushion located within the container and communicating with the inflator for inflation therefrom, means mounting the cushion to the support member, an outer closure covering the container, means mounting the closure to the support member, the inflator, container, cushion and closure being unitized to the support member to provide a module, and releasable means securing the support member to the hub to provide for assembly and disassembly of the module and steering wheel independently of the securement of the steering wheel hub to the vehicle steering column assembly.

2. In combination with a vehicle steering wheel including an upwardly opening hub and a rim, a modular occupant restraint system comprising, in combination, a support plate generally coterminus of the opening, cooperating means on the support plate and steering wheel locating the support plate in overlying relationship relative to the hub opening, an inflator mounted to the support plate and having an outlet, a container mounted on the support plate and providing a housing for an occupant restraint cushion, an occupant restraint cushion within the container communicating with the outlet of the inflator for inflation therefrom, means securing the cushion to the support plate, an outer closure of flexible material covering the container and having portions thereof extending around the edge of the support plate, and means securing the closure to the support plate whereby the inflator, container, cushion, and closure are unitized with the support plate to provide a module, and means securing the support plate to the hub with the closure portions being clamped between the support plate and hub to provide a seal between the hub and module.

3. In combination with a vehicle steering wheel including an upwardly opening hub and a rim, a modular occupant restraint system comprising, in combination, a support member generally coterminus of the hub opening, cooperating means on the support member and hub locating the support member relative to the upper side of the hub, an inflator located below the support member generally within the hub and having an outlet opening through the support member, means mounting the inflator to the support member, a container mounted on the support member and providing a housing for an occupant restraint cushion, an inflatable occupant restraint cushion mounted to the support member within the container and opening interiorly thereof to the outlet of the inflator for inflation therefrom, an outer closure of flexible material covering the container and having wall portions thereof providing continuations of the hub, means mounting the closure to the support member, whereby the inflator, container, cushion and closure are unitized to the support member to provide a module, and releasable fastening means for securing the cooperating means of the support member and the hub to each other to provide for assembly and disassembly of the module and steering wheel.

4. In combination with a vehicle steering wheel including an upwardly opening hub and a rim, a modular occupant restraint system comprising, in combination, a support plate generally coterminus of the hub opening, cooperating means on the support plate and steering wheel locating the support plate relative to the hub, an inflator located below the support plate generally within the hub, means mounting the inflator to the support plate, a container generally coterminus of the support plate and mounted thereon, an inflatable occupant restraint cushion within the container and having an inlet end secured to the support member in communication with the inflator, an outer closure covering the container, means mounting the closure to the support plate, whereby the inflator, container, cushion, and closure are unitized to the support plate to provide a module, and releasable means securing the support plate to the hub to provide for assembly and disassembly of the module and steering wheel.

5. In combination with a vehicle steering wheel including an upwardly opening hub and a rim, a modular occupant restraint system comprising, in combination, a support plate, cooperating means on the support plate and steering wheel locating the support plate in overlying relationship relative to the hub opening, an inflator located below the support member generally within the hub, means mounting the inflator to the support plate, a container having a rupturable wall at one end thereof and an opposite open end seated on the upper side of the support plate to provide a housing for an occupant restraint cushion, an inflatable occupant restraint cushion mounted to the support plate within the container and communicating with the inflator for inflation therefrom, an outer closure covering the container and including a rupturable wall generally coextensive with the rupturable container wall to permit deployment of the cushion therethrough, means mounting the container and closure to the support plate, whereby the inflator, container, cushion and closure are unitized to the support plate to provide a module, and releasable means securing the support plate to the hub to provide for assembly and disassembly of the module and steering wheel.

6. In combination with a vehicle steering wheel including a hub and a rim, a modular occupant restraint system comprising, in combination, a support member, cooperating means on the support member and steering wheel locating the support member relative to the hub, an inflator located between the support member and the hub and having an outlet opening through the support member, means mounting the inflator to the support member, a container mounted on the support member and providing a housing for an occupant restraint cushion, an occupant restraint cushion mounted to the support member within the housing and opening interiorly thereof to the outlet of the inflator for inflation therefrom, an outer closure covering the container, means mounting the closure to the support member, horn blowing switch means located between the closure and the support member for pressure actuation by the driver, whereby the inflator, container, cushion, closure and switch means are unitized with the support member to provide a module, and means mounting the module to the hub.

7. In combination with a vehicle steering wheel including a hub and a plurality of spokes supporting a rim, a modular occupant restraint system comprising, in combination, a support member including a plurality of extensions overlying the spokes, cooperating means on the support member and hub locating the support member relative to the upper side of the hub, an inflator located between the support member and the hub and having an outlet opening through the support member, a container including a plurality of extensions supported by the support member extensions, means mounting the container on the support member to provide a housing for an occupant restraint cushion, an occupant restraint cushion mounted to the support member within the housing and opening interiorly thereof to the outlet of the inflator for inflation therefrom, an outer closure covering the container and including a plurality of pressure deflectable portions covering the container extensions, means securing the closure to the support member, horn blowing switch means located between the closure portions and the container extensions and actuated by manual deflection of the closure portions, whereby the inflator, container, cushion, closure and switch means are unitized to the support member to provide a module and means mounting the module to the hub.

8. In combination with a vehicle steering wheel including a hub and a rim, a modular occupant restraint system comprising, in combination, a support member, cooperating means on the support member and steering wheel locating the support member relative to the upper side of the hub, an inflator located between the support member and the upper side of the hub and having an outlet opening through the support member, means mounting the inflator to the support member, a container mounted on the support member and providing a housing for an occupant restraint cushion, an occupant restraint cushion mounted to the support member within the housing and opening interiorly thereof to the outlet of the inflator for inflation therefrom, an outer closure covering the container and including a plurality of pressure deflectable portions, means mounting the closure to the support member, pressure actuated switch means mounted to the container under the pressure deflectable portions of the closure for actuation upon manual deflection of the closure portions, whereby the inflator, container, cushion, closure and switch means are unitized to the support member to provide a module, and releasable means securing the support member to the hub to provide for assembly and disassembly of the module and steering wheel.

9. In combination with a vehicle steering wheel including a hub and a plurality of spokes supporting a rim, a modular occupant restraint system comprising, in combination, a support member including a plurality of extensions equal in number to the number of spokes, cooperating means on the support member and steering wheel locating the extensions in overlying relationship to the spokes and the lower side of the support member in spaced relationship to the upper side of the hub, an inflator located in the space between the lower side of the support member and the hub and having an outlet opening through the support member to the upper side thereof, a container including an upper wall and a lateral side wall seating on the support member and defining therewith a generally closed housing for an occupant restraint cushion, means securing the container to the support member, an inflatable occupant restraint cushion mounted to the support member within the housing and opening interiorly thereof to the outlet of the inflator for inflation therefrom, an outer decorative closure including upper and lateral walls covering like walls of the container and extending to the lower side of the support member, means securing the closure to the support member, rupturable means in the upper walls of the container and closure for opening the walls upon inflation of the occupant restraint cushion to permit deployment of the cushion therethrough for engagement with a driver of the vehicle, and horn blowing switch means located between the closure and the extensions of the support member for pressure actuation by the driver.

10. In combination with a vehicle steering wheel including a hub adapted to be releasably secured to a vehicle steering column assembly and a rim, a modular occupant restraint system comprising, in combination, a support member, cooperating means on the support member and steering wheel locating the support member relative to the hub, an inflator mounted to the support member, an occupant restraint cushion mounted to the support member and communicating with the inflator for inflation therefrom, an outer closure mounted to the support member and including pressure deflectable portion, horn blowing switch means located between the pressure deflectable portion and the support member, the inflator, cushion, closure and switch means being unitized to the support member to provide a module, and releasable means securing the support member to the hub to provide for assembly and disassembly of the module and steering wheel independently of the securement of the steering wheel hub to the vehicle steering column assembly.

11. In combination with a vehicle steering wheel including a hub and a plurality of spokes supporting a rim, a modular occupant restraint system comprising, in combination, a support member including an extension respective to each spoke, cooperating means on the support member and steering wheel locating the support member in overlying relationship relative to the hub, an inflator mounted to the support member, an occupant restraint cushion mounted to the support member and communicating with the inflator for inflation therefrom, an outer closure of flexible material covering the cushion and having manually deflectable portions thereof extending over the support member extensions, means securing the closure to the support member, and pressure actuated horn blowing switch means supported on the extensions of the support member and underlying the manually deflectable portions of the closure, the inflator, cushion, closure and switch means being unitized with the support member to provide a module, and means securing the support member to the hub to assemble the steering wheel and module.

12. In combination with a vehicle steering wheel including a hub and a rim, a modular occupant restraint system comprising, in combination, a support member, cooperating means on the support member and hub locating the support member relative to the hub, an inflator, means mounting the inflator to the support member, an inflatable occupant restraint cushion mounted to the support member and communicating with the inflator for inflation therefrom, an outer closure of flexible material having a rupturable wall to permit deployment of the cushion therethrough and having pressure deflectable portions, spaced horn blowing switch means located between the pressure deflectable portions and the support member, conductor means interconnecting the switch means and lying in the path of cushion deployment through the rupturable wall, predetermined weakening means in the rupturable wall and conductor means permitting rupture thereof upon cushion deployment therethrough, and means mounting the closure to the support member, whereby the inflator, cushion closure, switch means, and conductor means are unitized to the support member to provide a module, and releasable fastening means for securing the support member and the hub to each other to provide for assembly and disassembly of the module and steering wheel.

13. In combination with a vehicle steering wheel including a hub and a rim, a modular occupant restraint system comprising, in combination, a support member, cooperating means on the support member and steering wheel locating the support member relative to the hub, an inflator, means mounting the inflator to the support member, a container mounted to the support member for providing a housing for an occupant restraint cushion and including a plurality of extensions located adjacent the steering wheel rim, an inflatable occupant restraint cushion housed within the container in communication with the inflator, an outer closure covering the container and including a plurality of flexible manually deflectable portions respective to the container extensions, horn blowing switch means including first contact means mounted to each extension and second flexible contact means supported on each extension in spaced relationship to a respective first contact means, the respective contact means being engageable upon deflection of a respective manually deflectable portion of the closure, and means mounting the closure to the support member, whereby the inflator, container, cushion, closure, and switch means are unitized to the support member to provide a module, and releasable means securing the support member to the hub to provide for assembly and disassembly of the module and steering wheel.

14. In combination with a vehicle steering wheel including a hub and a plurality of spokes supporting a rim, a modular occupant restraint system comprising, in combination, a support member, cooperating means on the support member and steering wheel locating the support member relative to the hub, an inflator, means mounting the inflator to the support member, a container mounted to the support member and having a rupturable wall providing a housing for an occupant restraint cushion, an inflatable occupant restraint cushion within the container and mounted to the support member in communication with the inflator for inflation therefrom, an outer closure covering the container and including a plurality of deflectable portions, each respective to one of the spokes, and a rupturable wall generally coextensive with the rupturable container wall to permit deployment of the cushion therethrough, means mounting the closure to the support member, horn blowing switch means located below each deflectable portion of the closure, conductor means interconnecting the switch means and supported on the rupturable wall of the container in the path of deployment of the cushion, and means weakening generally aligned portions of the container, conductor means and closure to provide for rupture thereof upon deployment of the cushion, the inflator, container, cushion, closure, switch means, and conductor means being thus unitized to the member to provide a module, and releasable means securing the support member to the hub to provide for assembly and disassembly of the module and steering wheel.

* * * * *